Apr. 17, 1923.
W. D. SMITH
1,451,793
REVERSIBLE DRIVING GEAR
Filed May 17, 1920
2 Sheets-Sheet 2
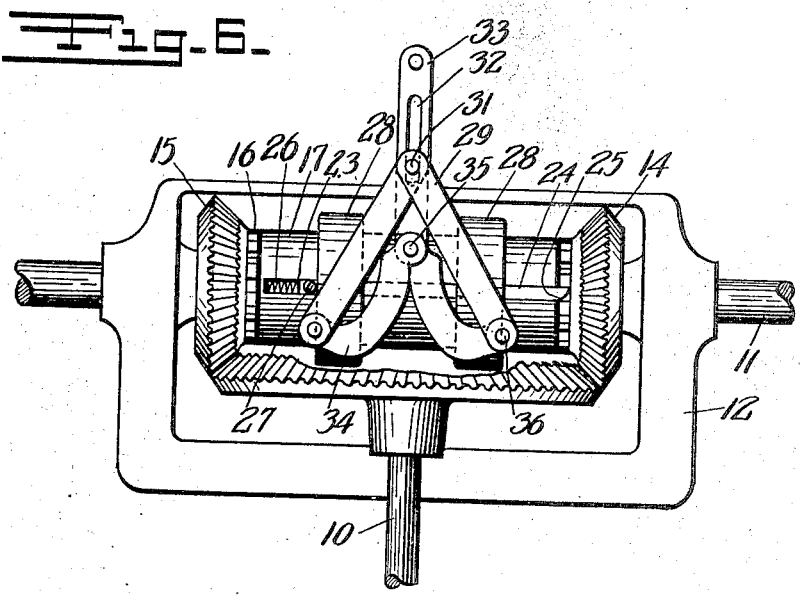
Fig. 6.
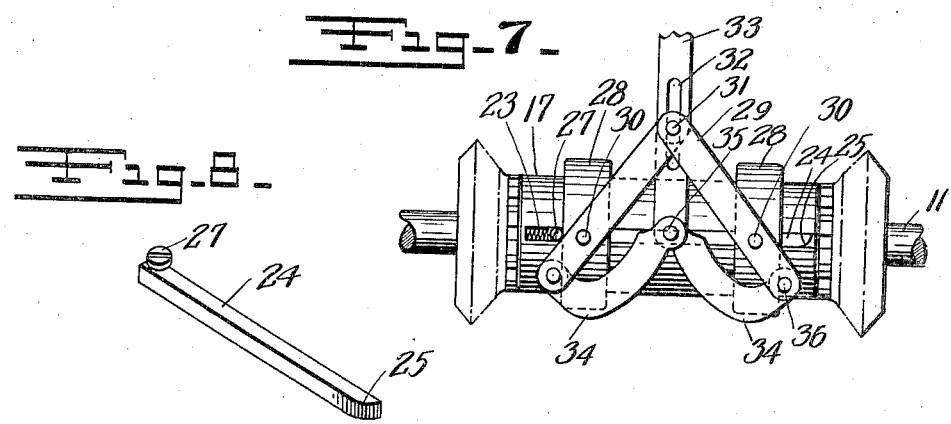
Fig. 7.
Fig. 8.
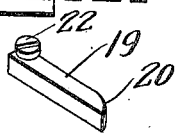
Fig. 9.
Winfield D. Smith, Inventor
By his Attorney
W. P. Hutchinson Patented Apr. 17, 1923.

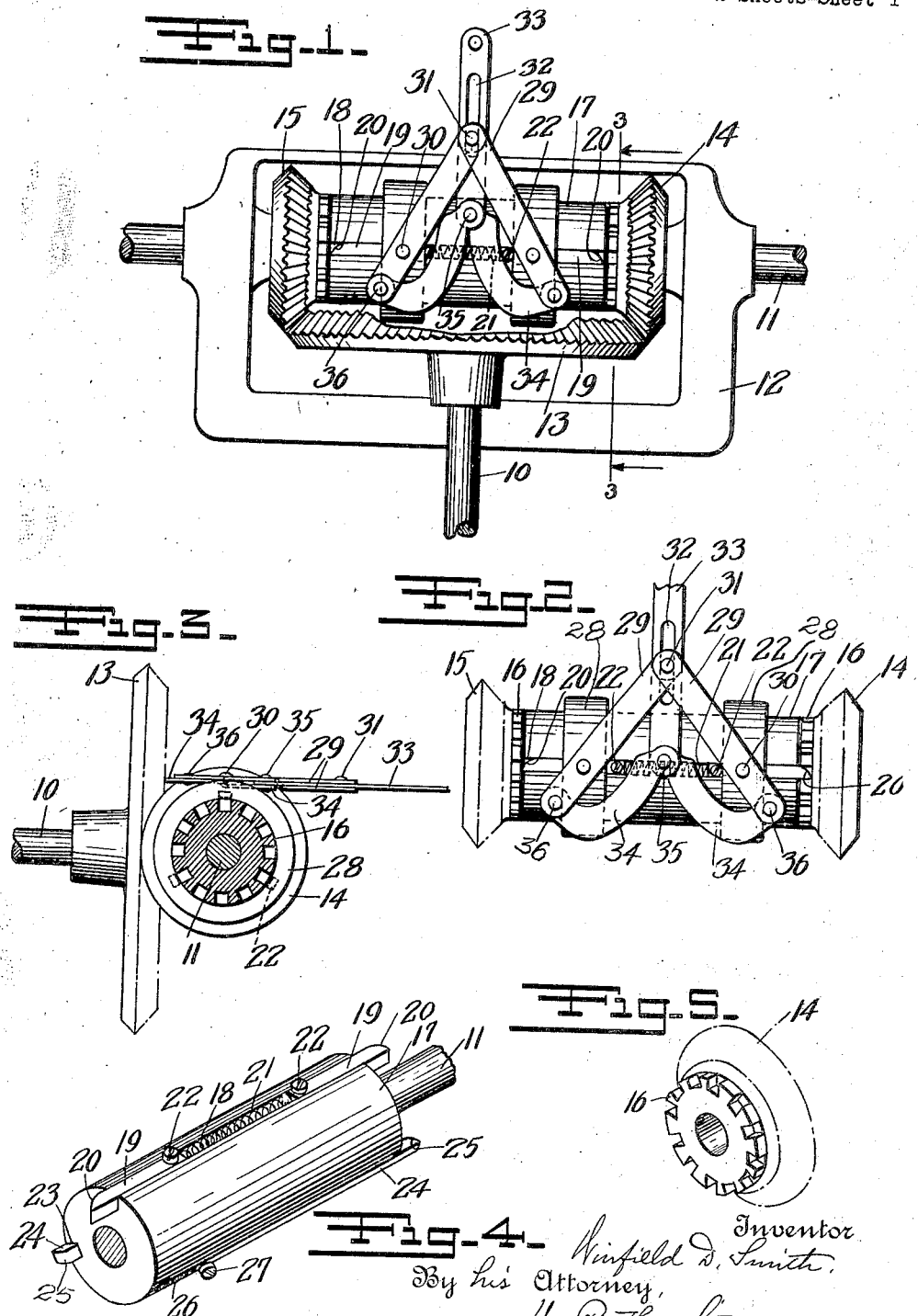

1,451,793

UNITED STATES PATENT OFFICE.

WINFIELD D. SMITH, OF NEWARK, NEW JERSEY.

REVERSIBLE DRIVING GEAR.

Application filed May 17, 1920. Serial No. 381,831.

*To all whom it may concern:*

Be it known that I, WINFIELD D. SMITH, a citizen of the United States, and a resident of the city of Newark, county of Essex, and State of New Jersey, have invented a new and useful Improvement in Reversible Driving Gears, of which the following is a full, clear, and exact description.

My invention relates to improvements in driving gears, and more particularly to driving gears in which an oscillatory motion of a driving shaft may be converted into a constant rotary motion of a driven shaft. For many purposes, and particularly as applied to vehicles, and more especially occupant propelled vehicles, it is desirable to have a simple means of converting an oscillatory to a rotary motion, and I have found it also desirable to have the mechanism for transmitting the oscillatory into a rotary motion in such a way that the driven shaft can be rotated in reverse directions if desired. The object of my invention is to produce a simple driving gear by which the above result can be easily attained, that is a driven shaft rotated in either direction, and my invention is further intended to provide a simple, substantial, and efficient means of accomplishing the above result.

Reference is to be had to the accompanying drawings forming a part of this specification, in which similar reference characters indicate corresponding parts in all the views.

Figure 1 is a broken plan view of the mechanism embodying my invention, showing a set of pawls out of engagement with the members which they drive.

Figure 2 is a similar view of the working part of the mechanism with the pawls in operative position.

Figure 3 is a cross section on the line 3—3 of Figure 1.

Figure 4 is a detail perspective view of the pawl carrying element of the invention.

Figure 5 is a detail perspective of one of the gear wheel hubs which is engaged by the pawls.

Figure 6 is a view similar to Figure 1, but showing a second set of pawls in operative connection.

Figure 7 is a view similar to Figure 6 but with the said second set of pawls in inoperative position.

Figure 8 is a detail of one of the pawls, and

Figure 9 is a detail of another pawl.

In the drawings the invention is shown by way of example, and it will be seen from the description which follows that many of the parts can be changed materially without affecting the principles of the invention.

As illustrated, a driving shaft 10 represents a shaft which is an oscillatory shaft, and any preferred means can be used for oscillating it. This shaft is arranged at right angles to the driven shaft 11, and both can be supported or carried in a framework 12 which can if desired, be an enclosing casing. The driving shaft 10 carries a bevel gear wheel 13 which meshes at opposite sides with bevel pinions or gears 14—15, which are loose on the driven shaft 11. These gears are each provided on their hubs with teeth 16 which are adapted to be engaged by pawls carried in a member 17 which is fast on the shaft 11, and fills the space intervening between the hubs of the gears 14—15. This pawl carrier 17 is provided with two sets of pawls which are adapted to slide longitudinally therein and engage the teeth 16 of the gears 14—15, but the pawls are oppositely inclined at their ends so that when one set of pawls engage the gears, the shaft 11 will be driven in one direction; but when the other set engage the gears, the direction of the driven shaft 11 will be reversed. In consonance with this idea, then, the carrier 17 has a way 18 extending longitudinally through it, in which is mounted a pair of pawls 19 arranged near opposite ends of the carrier, and provided with inclined end portions 20 which when the pawls slide from the ends of the carrier will alternately engage the teeth 16 of the gears 14—15. The pawls are firmly pressed outward by a spring 21 which is placed between them, and each is provided with an outwardly projecting abutment 22 which is shown in the form of a screw, and by means of which the pawls can be retracted as will hereinafter appear.

It will be seen that when the pawls are pressed outward by their spring 21 as in Figure 2, they will engage the teeth 16 of the gears 14—15. When the gear wheel 13 turns to the right, for instance as in Figure 1, it will rotate the gear 14 in one direction, and the gear 15 in the opposite direction, and therefore one of the pawls will be in locking engagement with the gear 14, for instance, and the movement of the gear will transmit its movement of rotation to the carrier 17 and to the shaft 11, while the opposite gear 15 will turn loosely, and its pawl will slide loosely over the teeth 16 by reason of its inclination 20. When, however, the gear 13 reverses, the opposite effect is had, and the gear 15 will transmit motion in the same direction to the carrier 17 and to the shaft 11, so that a constant rotary motion will be applied to the shaft. By way of example I have shown one set of these pawls 19 in the carrier 17, but obviously as many sets can be used as may be desirable or necessary.

For turning the shaft 11 in the opposite direction the carrier 17 is provided with a second set of pawls 24 which are arranged in separate ways 23, and which have inclined ends 25, these, however, being of opposite pitch to the inclined ends 20 of the pawls 19. The pawls 24 are arranged in separate ways, being longer than the pawls 19 and projecting from opposite ends of the carrier 17, this arrangement being for facility in operating as will presently appear. Each pawl 24 is urged forward by the spring 26 behind it, and is provided with an abutment 27 in the form of a screw by means of which the pawl can be moved against its spring.

While the pawls 19 and 24 can be moved in various ways, I have shown a simple and preferred means of doing it in which collars 28 are spaced apart to slide on the member or carrier 17. These collars, it will be seen by reference to the drawings, are adapted to strike on their inner sides the abutments 22 of the pawls 19, while their outer edges are adapted to engage or strike the abutments 27 of the pawls 24, one collar striking the abutment of one pawl 24, and the opposite collar striking the abutment of the second pawl 24. In the drawings I have shown one set of pawls 19 and two ways 23 carrying the pawls 24 because there is but one pawl 24 in a way.

It will be observed, especially by reference to Figures 1 and 2, that if the collars 28 are moved inward towards each other they will pull in the pawls 19 against the tension of their springs, and so hold both pawls clear of the teeth 16 of the gear wheels 14—15, while if the pawls are moved outward as in Figure 2, they will permit the pawls to engage said teeth. On the other hand, if the pawls are moved inward to bring the pawls 19 into inoperative position, they will release the abutments 27 of the pawls 24 and permit the springs to urge these pawls into operative position.

It will be seen, therefore, that by the sliding of the collars either set of pawls 19 and 24 can be put in position, and that the same operation which throws one set of pawls out of operative position, throws the second set into operative position.

Any suitable means can be used for actuating these collars. In the drawings a convenient and preferred means is shown in which levers 29 are connected to the collars 28 by pins 30 which act as fulcrums for the levers, and at their outer ends the levers are connected by a pin 31 which slides in the slot 32 of the slide bar 33 which can be actuated by any suitable or preferred lever or other arrangement. At their inner or short ends the levers 29 are pivotally connected with links 34, these being pivoted together, and to the inner end of the slide bar 33 as shown at 35, and also pivoted to the short ends of the levers 29 as shown at 36. It will be seen that when the slide bar is pushed inward, the separated ends of the levers 29 will spread, thus spreading the collars 28, and that on the opposite movement of the slide bar, the separated ends of the levers and the collars will approach each other, but as stated, other means can be used for actuating the collars 28 and their connected pawls.

I have shown and described a reversible driving gear in which the driving shaft is an oscillatory shaft, but it will be readily seen that if the motion of the driving shaft is constant, the shifting or reversing mechanism will work precisely as indicated.

I claim:—

1. A reversible gear for converting oscillatory into rotary motion, comprising an oscillating driving shaft having a fixed gear wheel thereon, a driven shaft having loose spaced gear wheels meshing with opposite sides of the gear wheel of the driving shaft, a spacing member fast on the driven shaft between the spaced gears, sets of pawls of opposite pitch on the spacing member, and a lever mechanism for selectively actuating the pawls to throw one set into engagement with the spaced gears, and the other set out of such engagement.

2. A reversible driving gear comprising an oscillatory driving shaft having a fixed gear wheel thereon, a driven shaft having spaced gears loose thereon, said gears having toothed hubs and being arranged to connect with the aforesaid driving gear, a pawl carrier between the spaced gears, sets of pawls on the carrier arranged to engage the toothed hubs of the gears, the sets of pawls being of opposite pitch, and a lever mechanism for selectively actuating the sets of pawls to move one set into and the other out of engagement with said toothed hubs.

3. A reversible driving gear comprising an oscillatory driving shaft having a driving gear thereon, a driven shaft having gears spaced apart thereon and meshing with the driving gear, said spaced gears having toothed hubs, a pawl carrier between the spaced gear wheels, said carrier being fast to the driven shaft, sets of pawls having ends of opposite pitch sliding in the carrier and engaging the toothed hubs, collars sliding on the carrier and engaging at their inner edges with the abutments on one set of pawls, and at their outer edges with abutments on the second set of pawls, and mechanism for sliding the collars.

4. A reversible driving gear comprising an oscillatory driving shaft having a gear wheel thereon, a driven shaft having gear wheels spaced apart and meshing with the driving gear, said spaced gear wheels having toothed hubs, a pawl carrier fast on the driven shaft between the spaced gears, collars sliding on the carrier, means for moving the collars back and forth with relation to each other, a set of pawls sliding in a way and adapted to move from opposite ends of the carrier to engage the aforesaid toothed hubs, abutments on the pawls extending into the path of the collars on the inner sides of the collars, and a second set of pawls of opposite pitch than the first mentioned set moving in separate ways in the carrier and having abutments engaging the outer edges of the collars, whereby upon the sliding of the collars one set of pawls moves in one direction and the second set in the opposite direction.

5. A reversible driving gear comprising an oscillatory driving shaft having a gear wheel thereon, a driven shaft having spaced gears thereon, said gears having toothed hubs and connecting with the aforsaid driving gear, a pawl carrier between the spaced gears, sets of pawls sliding in the carrier and engaging the toothed hubs of the gears, the several sets of pawls having opposite pitch, and a single lever mechanism for selectively actuating the sets of pawls to move one set into and the other out of engagement with said hubs.

WINFIELD D. SMITH.

Witnesses:
WARREN B. HUTCHINSON,
M. G. O'DONNELL.